Figure 1:
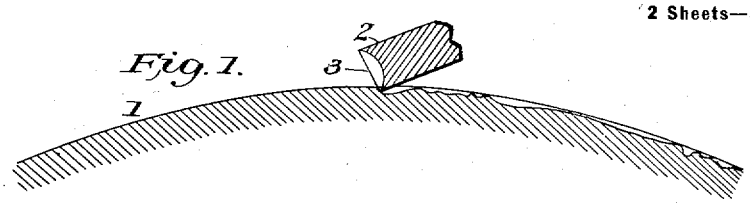

No. 11,857. Reissued Sept. 25, 1900.

T. A. EDISON.

PHONOGRAPH.

(Application filed Aug. 18, 1900.)

2 Sheets—Sheet 1.

Witnesses:

Archibald G. Rose

Jno. R. Taylor

Inventor:

Thomas A. Edison by Dyer Edmonds & Dyer

No. 11,857.

Reissued Sept. 25, 1900.

T. A. EDISON.

PHONOGRAPH.

(Application filed Aug. 18, 1900.)

2 Sheets—Sheet 2.

Witnesses:

Archibald G. Reese

Jno. R. Taylor

Inventor:

Thomas A. Edison by Ager Edmonds & Ager

UNITED STATES PATENT OFFICE.

THOMAS A. EDISON, OF LLEWELLYN PARK, NEW JERSEY.

PHONOGRAPH.

SPECIFICATION forming part of Reissued Letters Patent No. 11,857, dated September 25, 1900.

Original No. 652,457, dated June 26, 1900. Application for reissue filed August 18, 1900. Serial No. 24,246.

*To all whom it may concern:*

Be it known that I, THOMAS A. EDISON, a citizen of the United States, residing at Llewellyn Park, in the county of Essex and State of New Jersey, have invented a certain new and useful Improvement in Phonographs, (Case No. 1,014,) of which the following is a specification.

My invention relates to improvements in phonographs; and my object is to produce a phonograph wherein the loudness and quality of the reproduction will be increased.

Experience has demonstrated the superiority of the type of recorder described in my Patent No. 430,278, dated June 17, 1890, by which will be obtained a record composed of a series of more or less connected gouges of varying dimensions, all of less depth than width and presenting in cross-section at any point an arc depending in extent upon the depth of cut of the recorder. A record of this character offers a large bearing-surface for the customary spherical reproducing device and causes the latter to track automatically. It is well known that the imperfections in phonographic reproductions are due in part to the fact that the spherical reproducer is not allowed to engage all the portions of the record representing fundamental tones and principal overtones, because some of the waves or gouges thereof are of less length than width. By my present improvement I overcome this objection and obtain a reproducer for use in reproducing from records of the character described and which will automatically track the record-groove and engage all portions thereof representing fundamental tones and principal overtones even when the waves or depressions are greater in width than in length. In this way I am enabled to obtain better reproductions without the necessity of increasing the peripheral speed of the recording-surface. It is obvious that in the operation of the phonograph the formation of such representative waves or depressions having a greater width than length can be avoided by increasing the peripheral speed of the recording-surface and that when the waves are thus always characterized a spherical reproducer can be effectively used; but the increase in speed is objectionable, because the increased pressure imposed on the recording device prevents the latter from responding as sensitively to the sound-vibrations as when a lower speed is employed, and hence even the principal overtones will be in part at least omitted or imperfectly recorded. By means of my present improvement I effect a perfect tracking of the record, not by changing or distorting the record, but by the employment of a reproducer of such a form that it will enter all portions of the record as at present made at the usual surface speeds and which are more nearly graphically representative of the original sounds than are records made at abnormally-high surface speeds.

To this end my invention consists in employing, in combination with a record-groove of the character described, a reproducer presenting in cross-section to the record a curved form not greater than the curve of the cutting edge of the recorder and preferably of a slightly-less radius than that curve and which presents longitudinally of the record a bearing-surface rounded to prevent wear and of a materially-less radius than is presented to the record by the ordinary spherical reproducer. Preferably the specific form of reproducer which I employ is a cylinder inclined to the tangent of a cylindrical phonogram or to the record-surface of a flat phonogram, the bottom edge of the cylinder engaging the groove and said edge being provided with a rounded bead or projecting rib, which engages the record.

In order that my invention may be better understood, attention is directed to the accompanying drawings, forming a part of this specification, and in which—

Figure 2:
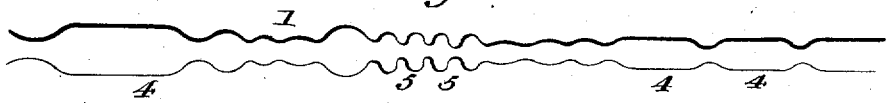
Figure 3:
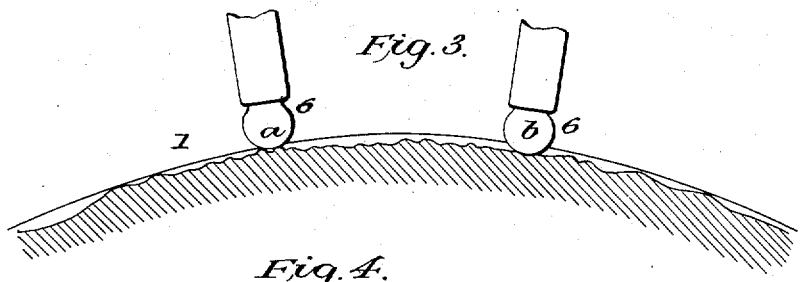
Figure 4:
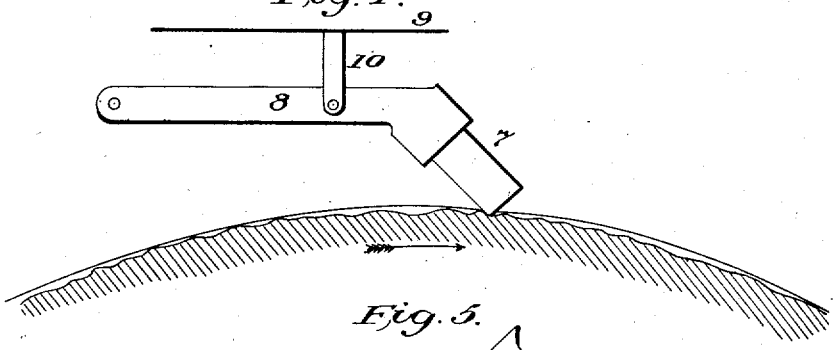
Figure 5:
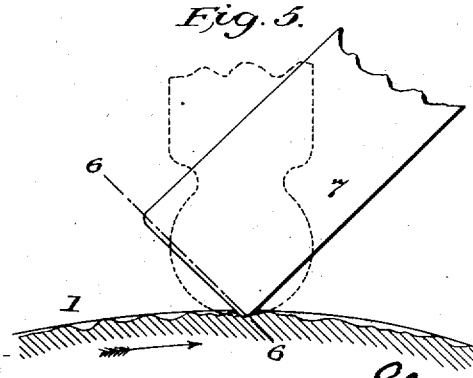
Figure 6:
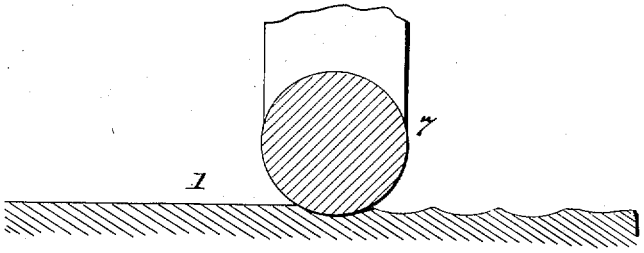
Figure 7:
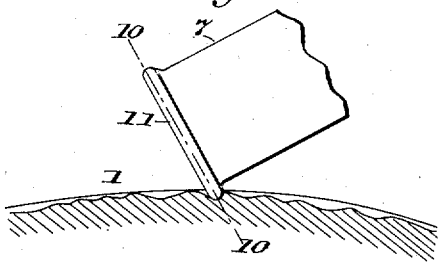

Figure 1 is a sectional view taken lengthwise of the record-groove, illustrating the manner of forming the record by means of a recorder of the type described in my said patent, the parts being enlarged for the purpose of clearness; Fig. 2, a plan view, on an enlarged scale, of a record-groove produced by a recorder having a curved cutting edge; Fig. 3, a diagram showing in longitudinal section, on an enlarged scale, a portion of a record-groove, at *a* a spherical reproducer engaging with a record-wave of less length than width, and at *b* a spherical reproducer engaging with a record-wave of greater length than width; Fig. 4, a section longitudinally through the record, on an enlarged scale, showing one form of the improved reproducer engaging with a record-wave of less length than width; Fig. 5, an enlarged section taken longitudinally of the record, showing the improved reproducing device placed in the opposite direction from that shown in Fig. 4 and illustrating in dotted lines the usual spherical reproducing device, whereby a comparison of the two reproducers can be conveniently made; Fig. 6, a section on the line 6 6 of Fig. 5; Fig. 7, a side elevation of the preferred form of the improved reproducer, and Fig. 8 a section on the line 10 10 of Fig. 7.

In all of the above views corresponding parts are represented by the same numerals and letters of reference.

1 represents a phonogram-blank, which is preferably cylindrical in form, of a soap-like composition, as is now common. Flat phonograms may be employed and other materials may be used.

2 represents the recorder of the type described in my said Patent No. 430,278, said recorder having a curved cutting edge 3 and being preferably hollowed out to facilitate the gouging or cutting of the records. With such a device the record will partake generally of the appearance shown in Fig. 2, being composed of a series of more or less connected gouges of varying dimensions, according to the amplitude or extent of movement of the recording-diaphragm and to the rapidity of vibration thereof. Owing to the relatively-great diameter of the recording edge to the depth of cut all the depressions of which the record is formed are characterized by a greater width than depth. Some of these waves—as, for instance, 4 4—are greater in length than width; but others, such as 5 5, are found in practice to be of less length than width. The effect of an attempt to reproduce these records with a spherical reproducer is shown clearly in Fig. 3, wherein two spherical reproducing-balls 6 6 are illustrated. In the case of the waves which are of greater length than width the reproducer, as at *b*, will be free to engage the entire length of the wave; but when the length of the wave is less than its width the spherical reproducer, as shown at *a*, will not be allowed to enter the record-groove, but will be arrested by the crests of the adjacent waves. The reproducer in the latter case, therefore, does not accurately track the record and the reproducer-diaphragm is not vibrated in accordance with the record.

Referring to Fig. 4, 7 represents one form of the improved reproducer, which may be connected directly to the diaphragm or to lever 8, which is connected to the diaphragm 9 by a link 10. The reproducer is preferably cylindrical in form, with its lower edge resting in the groove, the axis of the cylinder being preferably inclined at an angle of about forty-five degrees from the tangent of a cylindrical record or from the face of a flat record. The reproducer may be inclined in the direction of the movement of the blank, as shown in Fig. 4, or against the movement of the record, as shown in Fig. 5. The curve of the engaging edge of the reproducer, as shown in Fig. 6, is not more than the curve of the cutting edge 3 of the recording device and it is preferably slightly less than that curve, so that the reproducer can always be free to track accurately in the groove. The curve presented by the engaging edge of the reproducer longitudinally of the wave, as shown in Fig. 5, is very much less than is presented by a spherical reproducer, as may be seen from an examination of this figure. Hence a depression or wave which could not possibly be engaged by a spherical reproducer can be accurately tracked by my improved reproducer. At the same time the bearing-surface of the reproducing device is almost as great as that which is presented by a spherical reproducer, so that there will not be any excessive wear. By employing a reproducing device of this general character which will present lengthwise to the wave a very much less surface than is the case with the spherical reproducer I am enabled to accurately track a record even when certain of the waves, or all of them, representative of fundamental tones and principal overtones, are materially less in length than in width, and I therefore do away with the necessity of preventing the occurrence of such waves by operating the phonogram at an abnormally-high speed. It will be understood that instead of using a reproducer which is cylindrical in form any other form of reproducer may be employed presenting a curved surface to the record and with its longitudinal dimensions contracted sufficiently to allow it to enter to the full depth in the record-groove, even when the waves are very short and deep.

Figure 8:
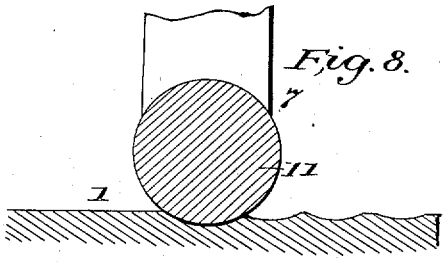

The preferred form of the reproducer is shown in Figs. 7 and 8, wherein the reproducer consists generally of a cylindrical shank having a rim 11 at its bottom edge, the curve presented by such rim at right angles to the record being shown in Fig. 8, while the curve which is presented by such rim longitudinally of the record is shown in Fig. 7. It is evident that this form of reproducer can be placed at a less inclination to the record than the form shown in Figs. 4 and 5, and I prefer to support it at no greater inclination to the record than is necessary to enable its holder to clear the record-surface. In all forms of the reproducer which have been illustrated the bearing-surface has a radius which is very much smaller longitudinally of the record than crosswise thereof, and this bearing-surface is one having the same width throughout its length, the length of the bearing-surface being at right angles to the length of the record-groove. The width of the bearing-surface may be reduced to the minimum when the recording-surface is made of a material which is sufficiently hard to withstand the scraping action of such a bearing-surface; but with softer recording materials the width of the bearing-surface of my improved reproducer should be increased to produce the requisite life of the record. I have found, however, that with recording-surfaces made of the soap compositions now commonly used for the cylinders of the phonograph the proportions of width to length shown in the drawings can be employed without excessive wear of the record.

Having now described my invention, what I claim as new, and desire to secure by Letters Patent, is as follows:

1. In a phonograph, the combination with a phonogram having a record thereon formed of a series of more or less connected gouges or waves with rounded sides and bottom, some of said waves representative of fundamental tones and principal overtones being characterized by a greater width than length, of a reproducing device having a curved bearing-surface engaging the bottom and side walls of the record and of a form adapted to enter and accurately track all of such representative waves, substantially as and for the purposes set forth.

2. In a phonograph, the combination with a phonogram having a record thereon formed of a series of more or less connected gouges or waves with rounded sides and bottom, some of said waves representative of fundamental tones and principal overtones being characterized by a greater width than length, of a reproducing device having a curved bearing-surface which engages the record-groove and reduced in its longitudinal dimension, whereby the reproducing-surface may accurately track a wave having a less length than width, substantially as set forth.

3. In a phonograph, the combination with a phonogram having a record thereon formed of a series of more or less connected gouges or waves with rounded sides and bottom, some of the waves representative of fundamental tones and principal overtones being characterized by a greater width than length and said waves differing from each other in the slope of their descending and ascending walls, of a reproducing device having a curved bearing-surface engaging the sides and bottom of the record and of a form adapted to enter and accurately track all of such representative waves, substantially as and for the purposes set forth.

4. In a phonograph, the combination with a phonogram having a record thereon formed of a series of more or less connected gouges or waves with rounded sides and bottom, some of the waves representative of fundamental tones and principal overtones being characterized by a greater width than length, of a reproducing device having a curved bearing-surface engaging the sides and bottom of the record to accurately track all of such representative waves, said reproducing device being of such a form as not to engage simultaneously the descending and ascending slopes of the waves, substantially as set forth.

5. In a phonograph, the combination with a phonogram having a record thereon formed of a series of more or less connected gouges or waves with rounded sides and bottom, some of said waves being characterized by a greater width than length, of a cylindrical reproducing device placed at an angle to the record and with its lower edge engaging the sides and bottom of the record, substantially as set forth.

6. In a phonograph, the combination with a phonogram having a record thereon formed of a series of more or less connected gouges or waves with rounded sides and bottom, some of said waves being characterized by a greater width than length, of a cylindrical reproducing device having a rounded bottom edge which engages the sides and bottom of the record, substantially as set forth.

7. As a new article of manufacture, an improved reproducer for phonographs, having a curved engaging edge, said edge being curved longitudinally of the record in a smaller radius than at right angles thereto, substantially as set forth.

8. As a new article of manufacture, a cylindrical reproducer maintained in an inclined position and having its bottom edge rounded for engagement with the record, substantially as set forth.

9. An improved phonograph-reproducer, consisting of a cylinder having at one end a rounded bead or rib, projecting beyond the periphery of the cylinder, which rib forms the bearing-surface of the reproducer, substantially as set forth.

This specification signed and witnessed this 10th day of August, 1900.

THOMAS A. EDISON.

Witnesses:
J. F. RANDOLPH,
J. A. BOEHMS.